United States Patent [19]

Piotrowicz, Sr.

[11] 3,945,361
[45] Mar. 23, 1976

[54] FUEL ATOMIZING DEVICE
[76] Inventor: Edward J. Piotrowicz, Sr., Rte. 2, Box 409, Walkerton, Ind. 46574
[22] Filed: Dec. 17, 1974
[21] Appl. No.: 533,541

[52] U.S. Cl.......... 123/141; 123/122 AA; 48/180 R
[51] Int. Cl.² ........................................ F02M 29/00
[58] Field of Search..... 123/141, 122 AA; 48/180 R

[56] References Cited
UNITED STATES PATENTS

| | | | |
|---|---|---|---|
| 1,462,750 | 7/1923 | Hart | 48/180 R |
| 1,577,704 | 3/1926 | Fleming | 48/180 R |
| 1,689,433 | 10/1928 | Harvey | 48/180 R |
| 2,659,667 | 11/1953 | Bosdet | 123/141 |
| 3,042,016 | 7/1962 | Christian | 123/122 AA |
| 3,482,556 | 12/1969 | Ferriday | 123/122 AA |
| 3,544,290 | 12/1970 | Larson | 48/180 R |

FOREIGN PATENTS OR APPLICATIONS

| | | | |
|---|---|---|---|
| 27,123 | 11/1910 | United Kingdom | 123/141 |
| 21,543 | 9/1909 | United Kingdom | 123/141 |
| 982,461 | 2/1965 | United Kingdom | 123/141 |

Primary Examiner—Charles J. Myhre
Assistant Examiner—R. H. Lazarus
Attorney, Agent, or Firm—Clarence A. O'Brien; Harvey B. Jacobson

[57] ABSTRACT

An elongated upstanding bearing block is provided and rotatably supports a bladed axial flow impeller from the upper end thereof with the axis of rotation of the impeller extending longitudinally of the bearing block. A pair of support arms are carried by and spaced about the block and include upper end portions outwardly displaced from corresponding peripheral portions of the block. The upper ends of the support arms are secured to peripherally spaced portions of a split expansion ring at points spaced from overlapped ends of the ring and a generally cylindrical screen body is disposed about the bearing block in spaced relation thereto and about the support arms and the split ring with the upper end of the cylindrical screen body being placed under expansive tension by means of the expansion ring, the upper end of the screen body being positionable within the inlet port of an intake manifold and retained therein by the expansive forces acting upon the upper end of the screen body by the split expansion ring. Further, a heat coil is spiralled about the bearing block spaced inwardly of the screen body and outwardly of the block and the opposite ends of the coil extend downwardly below the bearing block and the lower end of the screen body for projection into an underlying exhaust passage.

3 Claims, 3 Drawing Figures

U.S. Patent  March 23, 1976  3,945,361
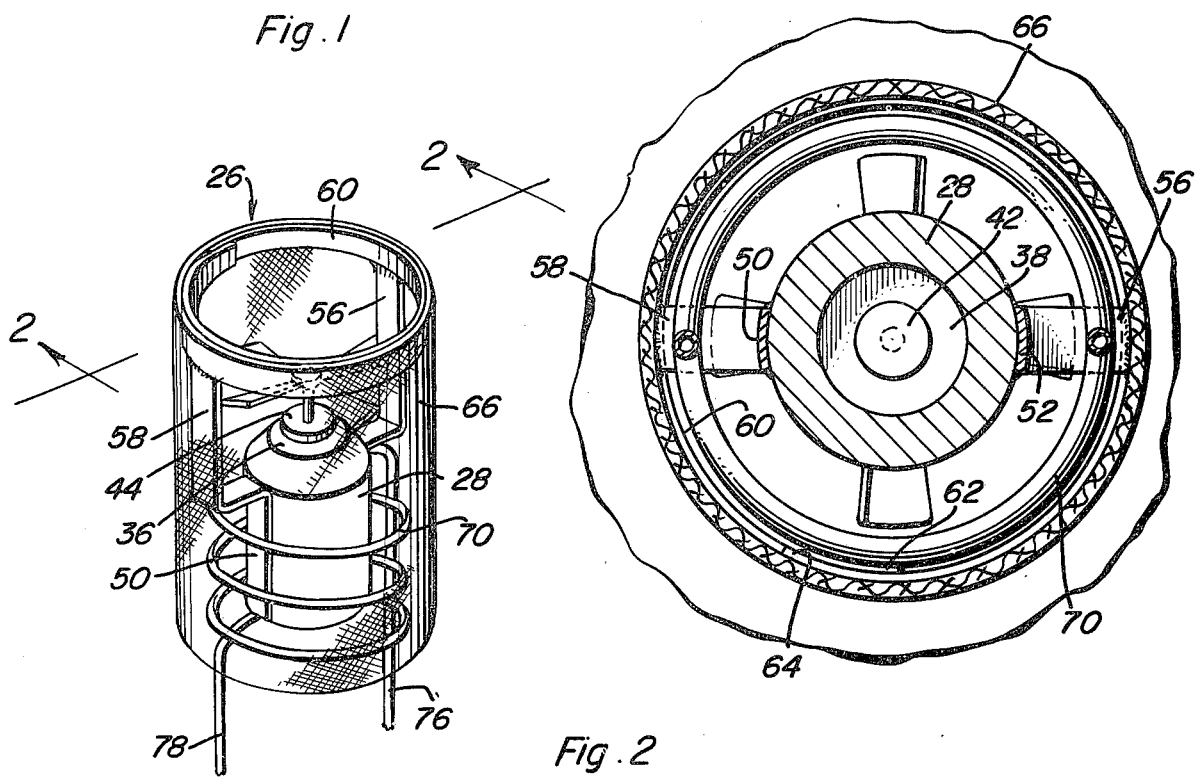
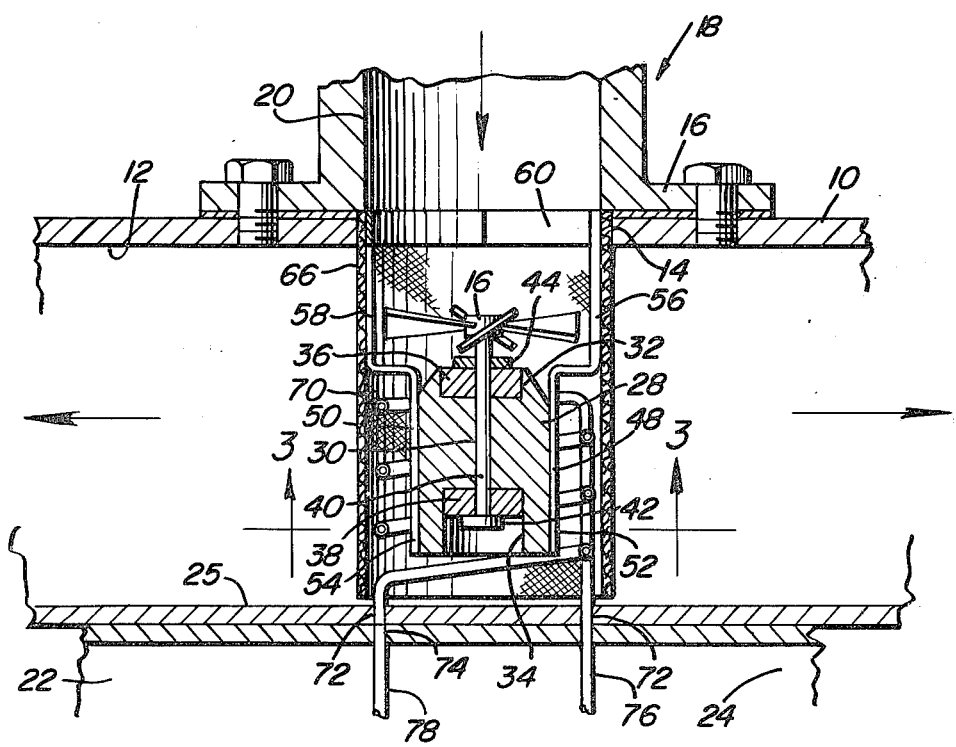

FUEL ATOMIZING DEVICE

BACKGROUND OF THE INVENTION

Various forms of fuel atomizing devices have been heretofore designed for the purpose of enabling and causing the liquid fuel components of a liquid fuel and air mixture entering the intake manifold of a combustion engine to be more completely atomized and thus fully vaporized. However, a large percentage of these previously devised fuel atomizing structures have for one reason or another not performed in a manner to promote the greatest efficiency of operation of the associated combustion engine. Examples of previously patented fuel atomizing devices including some of the basic structural features of the instant invention are disclosed in U.S. Pat. Nos. 1,061,655, 1,074,136, 1,132,351, 1,462,750 and 2,140,425.

BRIEF DESCRIPTION OF THE INVENTION

The fuel atomizing device of the instant invention utilizes a rotary bladed axial flow impeller jounaled from a bearing block to be supported within an intake manifold in registry with the inlet port or opening of the manifold to receive a fuel and air mixture from an associated carburetor. The bearing block and axial flow impeller are housed within a cylindrical screen body supported in generally concentric position relative to the impeller and with the screen body spaced radially outwardly from the impeller and bearing block. The bearing block includes structure by which the screen body is stationarily supported therefrom and the screen body may be radially and circumferentially expanded into tight frictional engagement at its inlet end within the aforementioned inlet port for the associated intake manifold. Also, a heat conductive tubular coil is disposed within the screen body in spaced relation relative to the latter and the bearing block and includes open opposite ends for direct communication with an adjacent exhaust passage whereby heat from the exhaust of the combustion engine may be utilized to warm the air and fuel mixture passing through the fuel atomizing device.

The main object of this invention is to provide an apparatus which will function to break up and more finely atomize liquid fuel droplets in an air and fuel mixture being inducted into the intake passages of the intake manifold of a combustion engine.

Another object of this invention is to provide a fuel atomizing device which will automatically function to more evenly distribute the overall volume of liquid fuel inducted into the intake manifold of a multi-cylinder combustion engine to each of the cylinders of the engine.

Still another object of this invention is to provide a fuel atomizing device which will function in a manner to more completely atomize liquid fuel being inducted into the intake passages of an internal combustion engine and thus result in more efficient operation of the engine.

Yet another object of this invention is to provide a fuel atomizing device in accordance with the preceding objects which will operate in an automatic manner to more completely vaporize the liquid fuel being inducted into an associated internal combustion engine.

A further important object of this invention is to provide a fuel atomizing device having a minimum number of moving parts and moving parts constructed in a manner so as to be adequately lubricated by the liquid fuel droplets inducted into the associated internal combustion engine.

A final object of this invention to be specifically enumerated herein is to provide a fuel atomizing device in accordance with the preceding objects and which will conform to conventional forms of manufacture, be of simple construction and easy to install so as to provide a device that will be economically feasible, long lasting and trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the fuel atomizing device of the instant invention;

FIG. 2 is a vertical sectional view illustrating the fuel atomizing device operatively associated with the air and fuel induction passages of an associated intake manifold; and FIG. 3 is an enlarged horizontal sectional view taken substantially upon the plane indicated by the section line 3—3 of FIG. 2.

DETAILED DESCRIPTION OF THE INVENTION

Referring now more specifically to the drawings, the numeral 10 generally designates an intake manifold including an air induction passage 12 formed therein. The manifold 10 includes an inlet port 14 which opens laterally into a central portion of the passage 12 at substantially right angles relative thereto and the base mounting flange 16 of a conventional form of carburetor referred to in general by the reference numeral 18 is removably mounted on the manifold 10 with the outlet end of the fuel and air passage 20 extending through the carburetor 18 in registry with the inlet port 14.

The intake manifold 10 further is of the type superimposed upon an exhaust manifold portion 22 defining an exhaust passage 24 therein with the exhaust manifold portion 22 in good heat conducting relation with the adjacent portion 25 of the intake manifold 10.

The fuel atomizing device of the instant invention is generally referred to by the reference numeral 26 and includes a cylindrical bearing block 28 having an axial passage 30 formed therethrough. The opposite ends of the passage 30 include counterbores 32 and 34 in which bearing members 36 and 38 are seated.

An impeller shaft 40 is journaled through the axial passage or bore 30 and the bearing members 36 and 38. The lower end of the shaft 40 includes an enlargement 42 thereon opposing the lower end of the bearing member 38 and the upper end of the shaft 40 has a thrust washer 44 mounted thereon which opposes the upper end face of the bearing member 36. That portion of the shaft 40 which projects above the thrust washer 44 has a bladed axial flow impeller 46 mounted thereon.

Diametrically opposite portions of the bearing block 28 have lower end portions 48 and 50 of a pair of mounting arms 52 and 54 secured thereto and the mounting arms 52 and 54 include parallel outwardly displaced upper end portions 56 and 58 secured to diametrically opposite portions of a split expansion ring 60 having overlapped ends 62 and 64. A cylindrical screen body encloses the bearing block 28, the mounting arms 52 and 54 and the impeller 46. The lower end portion of the screen body 66 is spaced radially outwardly of the lower end portions 48 and 50 of the mounting arms 52 and 54 and the upper end portion of the screen body 66 snugly embraces the upper end portions 56 and 58 of the mounting arms 52 and 54. The upper terminal end of the screen body 66 is radially and circumferentially expanded into tight frictional seated engagement within the inlet port 14 by the expansion ring 16.

It will be noted that when the fuel atomizing device 26 is mounted within the passage 12 of the manifold 10 the lower end of the screen body 66 is but slightly spaced from the inner surfaces of the manifold 10 defining those wall portions of the passage 12 opposing the inlet port 14. Also, the atomizing device 26 includes a tubular coil 70 extending about the bearing block 28 in spaced relation relative thereto and inwardly spaced from the adjacent portions of the screen body 66. The tubular coil 70 includes opposite end portions which project downwardly and through aligned bores 72 and 74 formed in the contacting wall portions of the manifold 10 and the exhaust manifold portion 22, the opposite end portions of the tubular coil 70 being designated by the reference numerals 76 and 78 and opening into the passage 24. In this manner, exhaust gases from the passage 24 may circulate through the tubular coil 70 in order to heat the latter and thus the air and fuel mixture inducted into the manifold 10 will be heated by the coil 70.

In operation, the atomizing device 26 is mounted within the inlet port 14 of the intake manifold 10 as illustrated in FIG. 2 of the drawings and hereinbefore described with the opposite ends of the coil 70 projecting through the aligned bores 72 and 74. As a mixture of air and fuel is inducted into the manifold 10 through the intake port 14 the impeller 46 is caused to rotate at a high speed and thus the inducted air and fuel mixture passing between the blades of the impeller 46 has great turbulence imparted thereto and is subsequently heated by the coil 70 and thereafter forced outwardly through the screen body 66. Accordingly, the air and fuel mixture inducted into the manifold 10 is acted upon three different times in succession in a manner to improve the vaporization of any liquid fuel droplets remaining in the air and fuel mixture.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination an internal combustion engine including an intake manifold of the type including a main passage extending therethrough and an inlet port opening transversely into said passage intermediate its opposite ends, a fuel atomizing device comprising a central elongated bearing block, a rotary bladed axial impeller journaled from and outwardly of one end of said block, a cylindrical screen body substantially concentrically disposed about said block and said impeller in spaced relation thereto and with the latter spaced inwardly of one inlet end of said body, and mounting means stationarily supporting said block in position within said body and the latter from said manifold with said inlet end of said screen body disposed within the inlet port of said manifold and the remainder of said screen body extending substantially fully transversely across the central passage of the manifold into which said inlet port opens, said mounting means including a pair of opposite side elongated arms supported from said block and having one pair of ends thereof projecting endwise outwardly of said one end of said block, a split expansion ring disposed outwardly of said one end of said block and to peripherally spaced portions thereof said one pair of arm ends are secured, said expansion ring being expanded in said inlet end of said body and thereby expanding said inlet end of said screen body into seated position within said port.

2. The combination of claim 1 wherein said journal block has a central bore formed therethrough, the opposite ends of said bore including enlarged counterbores, bearing assemblies disposed in said counterbores, a shaft extending through said bore and having its opposite ends journaled from said block by said bearing assemblies, said shaft having said impeller mounted thereon.

3. The combination of claim 1 including a heat conductive coil disposed about said block within said screen body spaced from the latter and said block, the opposite ends of said coil including inlet and outlet end portions projecting endwise outwardly of the lower end of said screen body for passage into an adjacent exhaust manifold exhaust gas passage.

* * * * *